US006391457B1

(12) United States Patent
Welty et al.

(10) Patent No.: US 6,391,457 B1
(45) **Date of Patent: *May 21, 2002**

(54) COATED ARTICLE

(75) Inventors: Richard P. Welty; Patrick A. Sullivan, both of Boulder, CO (US); John Finch, Livonia, MI (US)

(73) Assignee: Vapor Technologies, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/471,916

(22) Filed: Dec. 23, 1999

(51) Int. Cl.[7] .................................................. B32B 9/00

(52) U.S. Cl. ........................ 428/412; 428/457; 428/458; 428/461; 428/469; 428/472; 428/474.4; 428/698; 428/699; 428/701

(58) Field of Search ................................. 428/697, 699, 428/701, 472, 698, 457, 469, 474.4, 412, 458, 461

(56) References Cited

U.S. PATENT DOCUMENTS 3,838,512 A 10/1974 Sanderson
3,977,839 A 8/1976 Palisin, Jr.
4,109,052 A 8/1978 Anderson
4,148,967 A 4/1979 Satoh et al.
4,305,981 A 12/1981 Muroi et al.
4,321,299 A 3/1982 Frazer
4,369,225 A 1/1983 Manabe et al.
4,374,717 A 2/1983 Drauglis et al.
4,591,418 A 5/1986 Snyder
4,911,811 A 3/1990 Mullaney, Jr.
4,931,366 A 6/1990 Mullaney, Jr.
RE34,173 E 2/1993 Kerber
5,482,788 A 1/1996 Moysan, III et al.
5,484,663 A 1/1996 Moysan, III et al.
5,510,164 A 4/1996 Best et al.
5,552,233 A 9/1996 Moysan, III et al.
5,589,280 A 12/1996 Gibbons et al.
5,626,972 A 5/1997 Moysan, III et al.
5,639,564 A 6/1997 Moysan, III et al.
5,641,579 A 6/1997 Moysan, III et al.
5,648,179 A 7/1997 Moysan, III et al.
5,654,108 A 8/1997 Moysan, III et al.
5,656,335 A 8/1997 Schwing et al.
5,922,478 A 7/1999 Welty et al.
5,948,548 A 9/1999 Welty et al.
6,090,490 A 7/2000 Mokerji
6,096,426 A 8/2000 Mokerji
6,103,381 A 8/2000 Mokerji
6,132,889 A 10/2000 Welty et al.
6,143,424 A 11/2000 Jonte et al.
6,168,242 B1 1/2001 Mokerji

*Primary Examiner*—Archene Turner
(74) *Attorney, Agent, or Firm*—Myron B. Kapustij; Lloyd D. Doigan

(57) ABSTRACT

An article having on at least a portion of its surface a multi-layer coating comprising (i) a polymeric base coat, a chrome adhesion promoting layer, a chromium compound layer, and a layer comprised of a metal compound or metal alloy compound; or (ii) a polymeric base coat, a chromium compound layer, and a layer comprised of a metal compound or metal alloy compound. The layers comprised of chrome, chromium compound and metal compound or metal alloy compound are deposited by vapor deposition, preferably physical vapor deposition.

24 Claims, 2 Drawing Sheets

COATED ARTICLE

FIELD OF THE INVENTION

This invention relates to articles having a multi-layer decorative and protective coating thereon.

BACKGROUND OF THE INVENTION

It is currently the practice with various articles, such as for example, brass or zinc articles, such as faucets, faucet escutcheons, door knobs, door handles, door escutcheons and the like to first buff and polish the surface of the article to a high gloss and to then apply a protective organic coating, such as one comprised of acrylics, urethanes, epoxies, and the like, onto this polished surface. This system has the drawback that the buffing and polishing operation, particularly if the article is of a complex shape, is labor intensive. Also, the known organic coatings are not always as durable as desired, and are susceptible to attack by acids. It would, therefore, be quite advantageous if articles, such as for example, brass or zinc articles, or indeed other articles, could be provided with a coating which provided the article a decorative appearance such as, for example, that of highly polished brass, provided wear resistance and corrosion protection, and also provided improved chemical resistance. The present invention provides such a coating.

SUMMARY OF THE INVENTION

The present invention is directed to an article, such as a plastic, ceramic, or metallic article, preferably a metallic article, having a multi-layer coating on at least a portion of its surface. More particularly, it is directed to an article or substrate, particularly a metallic article such as stainless steel, aluminum, brass or zinc, having deposited on its surface multiple superposed layers of certain specific types of materials. The coating is decorative and also provides corrosion resistance, wear resistance and improved resistance to chemicals, such as acids. In one embodiment the coating provides the appearance of highly polished brass, i.e., has a brass color tone, while in another embodiment it provides the color of chrome.

The article has deposited on its surface a polymeric base coat layer. The polymeric base coat layer functions to level the surface of the article, cover any scratches or imperfections in the surface of the article, and provide a smooth and even surface for the deposition of the subsequent layers of the multi-layered coating.

In one embodiment over the polymeric base coat layer is applied, by vapor deposition, a chromium adhesion promoting layer. Over the chromium adhesion promoting layer is deposited a relatively thick strengthening layer comprised of chromium compound. Over the strengthening layer is deposited a color layer comprised of a metal such as chromium, stainless steel, refractory metal, etc., or of a reacted metal compound such as zirconium nitride, titanium nitride, zirconium-titanium alloy nitride, and the like. In another embodiment the chromium adhesion promoting layer is absent and the chromium compound strengthening layer is deposited directly onto the polymeric base coating layer.

In another embodiment disposed over the color layer is a transparent protective layer comprised of a metal oxide or metal alloy oxide or, the reaction products of (a) metal or metal alloy, (b) oxygen, and (c) nitrogen. This transparent, protective layer provides improved chemical resistance, such as improved resistance to acids and bases, and improved corrosion resistance.

DESCRIPTION OF THE PREFERRED EMBODIMENT

Figure 1:
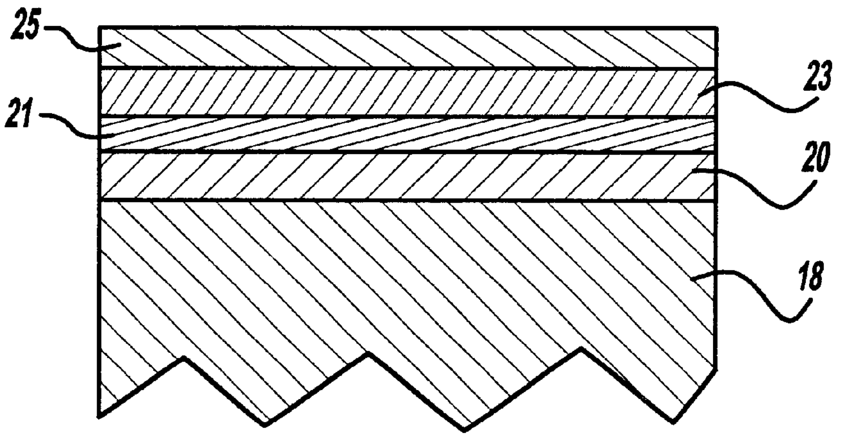
FIG. 1 is a cross-sectional view, not to scale, of a portion of an article having the multi-layer coating on its surface.

The article or substrate 18 can be comprised of any suitable material such as plastic, ceramic, metal or metal alloy. The metals include, for example, nickel, aluminum, copper, steel and zinc. The metal alloys include, for example, nickel alloys and brass. The plastics forming the substrate include, but are not limited to, polycarbonate, nylon, acrylonitrile-butadiene-styrene, polyester, polyolefin, and the like.

Over the surface of the article 18 is deposited a polymeric or resinous layer 20. The polymeric or resinous layer or base coat 20 may be comprised of both thermoplastic and thermoset polymeric or resinous material. These polymeric or resinous materials include the well known, conventional and commercially available polyacrylates, polymethacrylates, polyepoxies, alkyds, polyurethanes, and styrene containing polymers such as polystyrene and styrene-acrylonitrile (SAN), and blends and copolymers thereof.

The polyacrylates and polymethacrylates are polymers or resins resulting from the polymerization of one or more acrylates such as, for example, methyl acrylate, ethyl acrylate, butyl acrylate, 2-ethylhexyl acrylate, etc., as well as the methacrylates such as, for instance, methyl methacrylate, ethyl methacrylate, butyl methacrylate, hexyl methacrylate, etc. Copolymers of the above acrylate and methacrylate monomers are also included within the term "polyacrylates or polymethacrylates" as it appears herein. The polymerization of the monomeric acrylates and methacrylates to provide the polyacrylate resins useful in the practice of the invention may be accomplished by any of the well known polymerization techniques.

The styrene-acrylonitrile resins and their preparation are disclosed, inter alia, in U.S. Pat. Nos. 2,769,804; 2,989,517; 2,739,142; 3,935,152 and 4,291,134, all of which are incorporated herein by reference.

The alkyd resins are disclosed in "Alkyd Resin Technology", Patton, Interscience Publishers, New York, N.Y., 1962, and in U.S. Pat. Nos. 3,102,866; 3,228,787 and 4,511,692, all of which are incorporated herein by reference.

Polyurethanes are well known in the art and are readily commercially available. Various known polyols and polyisocyanates are used to form polyurethanes. Polyurethanes are described, for example, in chapter x, Coatings, pp. 453–607 in J.H. Saunders and K.C. Frisch, Polyurethanes: Chemistry and Technology, Part II, Interscience Publishers (New York, 1964), incorporated herein by reference.

Suitable polyurethanes may be prepared in a conventional manner such as by reacting polyols or hydroxylated polymers with organic polyisocyanates in the manner well known in the art. Suitable organic polyisocyanates include, for instance, ethyl diisocyanate; ethylidene diisocyanate; propylene-1, 2-diisocyanate; cyclohexylene-1, 2-diisocyanate; m-phenylene diisocyanate; 2,4-toluene diisocyanate; 2,6-toluene diisocyanate; 3,3'-dimethyl-4, 4'-biphenyl diisocyanate; p,p',p"-triphenylmethane triisoene diisocyanate; 3,3'-diphenyl-4, 4'-biphenylene diisocyanate; 4,4'-biphenylene diisocyanate; 3,3'-dichloro-4, 4-biphenylene diisocyanate; p,p',p"-triphenylmethane triisocyanate; 1,5-mepthalene diisocyanate; furfurylidene diisocyanate or polyisocyanates, in a blocked or inactive form such as the bis-phenyl carbamates of 2,4- or 2,6-toluene diisocyanate; p,p"-diphenyl methane diisocyanate; p-phenylene diisocyanate; 1,5-napthalene diisocyanate and the like. It is preferred to use a commercially available mixture of toluene diisocyanates which contains 80 percent 2,4-toluene diisocyanate and 20 percent 2,6-toluene diisocyanate or 4,4-diphenylmethane diisocyanate.

Polyurethanes applied as base coats in accordance with the invention may, of course, be in the form of solutions in suitable solvents such as xylene, toluene, methyl ethyl ketone, butanol, butyl acetate, etc.

Materials for the polyurethane base coats may be supplied in one package or two package prepolymer systems or oil modified systems, etc., all in the manner well known in the industry. Such materials are described for instance in the pamphlet "Urethane Coatings", published by the Federation of Societies for Paint Technology (1970). Radiation-curable urethane coatings may also of course be used.

Some illustrative examples of suitable polyurethane compositions are disclosed in U.S. Pat. Nos. 4,699,814; 4,681, 811; 4,703,101; 4,403,003 and 5,268,215, all of which are incorporated herein by reference.

Another suitable type of polyurethane is an acrylic polyurethane. The acrylic polyurethanes are described in U.S. Pat. Nos. 3,558,564; 4,131,571 and 4,555,535, all of which are incorporated herein by reference.

The polyepoxies are disclosed in "Epoxy Resins", by H. Lee and K. Nevill, McGraw-Hill, New York, 1957, and in U.S. Pat. Nos. 2,633,458; 4,988,572; 4,734,468; 4,680,076; 4,933,429 and 4,999,388, all of which are incorporated herein by reference.

Some suitable epoxy resins include glycidyl ethers of polyhydric phenols and polyhydric alcohols prepared by the reaction of epichlorohydrin with a compound containing at least one hydroxyl group, such as for example bisphenol-A, carried out under alkaline reaction conditions.

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl) methane and 4,4'-dihydroxybiphenyl, or aliphatic polyols such as 1,4-butanediol and glycerol.

These epoxy resins include the glycidyl polyethers of polyhydric phenols and polyhydric alcohols, particularly the glycidyl polyethers of 2,2-bis(4-hydroxyphenyl) propane.

These polymeric materials may optionally contain the conventional and well known fillers such as mica, talc and glass fibers.

The polymeric layer or base coat 20 may be applied onto the surface of the substrate by any of the well known and conventional methods such as dipping, spraying, brushing, electrocoating and electrostatic spraying.

The polymeric layer 20 functions, inter alia, to level the surface of the substrate, cover any scratches or imperfections in the surface and provide a smooth and even surface for the deposition of the chrome layer.

The polymeric base layer or base coat 20 has a thickness at least effective to level out the surface of the substrate. Generally, this thickness is from about 0.1 mil to about 10 mils, preferably from about 0.2 mil to about 5 mils, and more preferably from about 0.3 mil to about 1.5 mils.

In one embodiment of the invention over the polymeric base coat layer 20 is deposited a thin adhesion promoting chromium layer 21. Layer 21 serves to improve or promote the adhesion of the chromium compound layer 23 to the polymer base coat layer 20. Layer 21 has a thickness which is at least effective to promote or improve the adhesion of layer 23. This thickness is generally from about 5 nm to about 200 nm, preferably from about 30 nm to about 60 nm. The chrome layer 21 is deposited by well known and conventional vapor deposition techniques including physical vapor deposition and chemical vapor deposition.

Physical vapor deposition processes are well known and conventional and include cathodic arc evaporation (CAE) or sputtering, and the like. Sputtering techniques and equipment are disclosed, inter alia, in J. Vossen and W. Kern "Thin Film Processes II", Academic Press, 1991; R. Boxman et al, "Handbook of Vacuum Arc Science and Technology", Noyes Pub., 1995; and U.S. Pat. Nos. 4,162,954 and 4,591, 418, all of which are incorporated herein by reference.

Chemical vapor deposition (CVD) is a well known and conventional process. CVD is generally classified into one of three types. The first two are principally predicated upon reactor pressure, and are designated as atmospheric pressure chemical vapor deposition (APCVD) or low pressure chemical vapor deposition (LPCVD). The third category is referred to as plasma enhanced chemical vapor deposition.

CVD processes are disclosed, inter alia, in U.S. Pat. Nos. 5,782,980; 5,824,365; 5,254,499; 4,803,127; 5,064,686 and 5,571,572, all of which are incorporated herein by reference.

Over chromium adhesion promoting layer 21 is deposited strengthening layer 23 comprising a chromium compound, preferably chromium nitride. The chromium compounds include the carbides, carbonitrides and nitrides, with the chromium nitrides being preferred. Other chromium compounds include, e.g., chromium oxide, chromium carbide, chromium carbonitride, and chromium oxynitride. These compounds and their preparation are conventional and well known. The chromium compound layer 23 functions to provide the coating with mechanical strength and low stress. The thickness of the chromium compound layer 23 is a thickness at least effective to provide the coating with mechanical strength. Generally this thickness is from about 0.5 microns to about 10 microns, preferably from about 2 microns to about 5 microns.

The chromium compound layer 23 is deposited by well known and conventional vapor deposition techniques including, but not limited to, reactive sputtering and reactive cathodic arc evaporation. Reactive cathodic arc evaporation and reactive sputtering are generally similar to ordinary sputtering and cathodic arc evaporation except that a reactive gas is introduced into the chamber which reacts with the dislodged target material. Thus, in the case where chromium nitride is the layer 23, the cathode is comprised of chrome and nitrogen is the reactive gas introduced into the chamber.

It is important to minimize the internal stress of the chromium compound such as CrN layer, since the relatively soft polymer underlayer has limited ability to resist buckling of the harder CrN layer. Stress-induced buckling of the CrN film can cause loss of reflectivity due to cracking and surface waviness. It is well known that the internal stress of PVD deposited thin films can be influenced by such process parameters as gas pressure and composition, deposition rate, and substrate bias and temperature. Special substrate biasing techniques such as voltage pulsing or AC or RF power may also be applied. Electrical contact between the biased rack and the growing film is necessary for effectiveness of DC bias techniques. The deposition process parameters may be adjusted appropriately by, for example, observing the amount and direction of curvature of a chromium nitride coating deposited onto a small sample of thin aluminum foil. Sufficiently stress-free CrN films do not cause curling of the aluminum foil.

Chromium-nitrogen thin films generally exist as mixed phase materials comprising CrN, $Cr_2N$, and Cr in proportions depending on the total nitrogen content. In this application the term "chromium nitride" refers to such a mixed phase material with average nitrogen content between about 5 and 50 atomic percent. The nitrogen content of a film influences the hardness, stress, and elastic properties of the film, and may be adjusted experimentally along with layer thickness to optimize performance for particular applications. The nitrogen content of the chromium nitride films according to the present invention is preferably in the range of about 5 to about 50 atomic percent, and more preferably in the range from about 10 to about 30 atomic percent, with the chromium content in the range of from about 70 to about 90 atomic percent.

Figure 3:
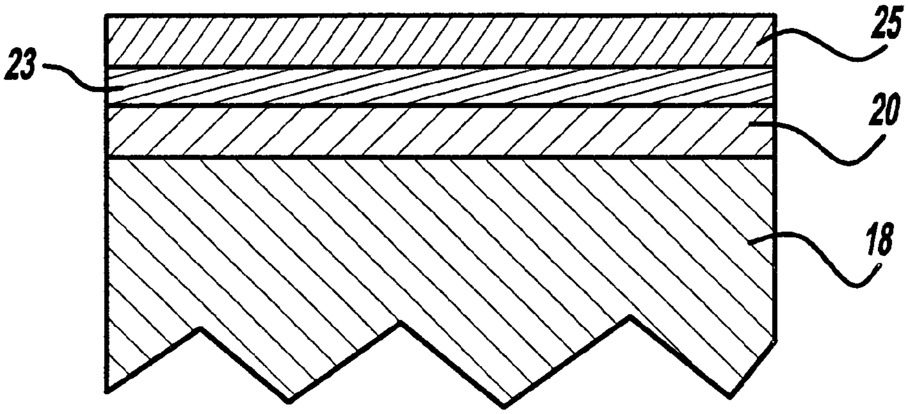
FIG. 3 is a view similar to FIG. 1 except that there is no chrome adhesion promoting layer.

In another embodiment, as illustrated in FIG. 3, adhesion promoting chrome layer 21 is absent and strengthening layer 23 comprising a chromium compound is disposed directly on the polymeric layer 20.

Over the strengthening layer 23 is disposed color layer 25 comprised of a metal, metal alloy, metal compound or a metal alloy compound. Preferred metals and metal alloys are the refractory metals and refractory metal alloys. The refractory metals and refractory metal alloys include chromium, stainless steel, titanium, zirconium, tantalum, tungsten, molybdenum, hafnium, niobium and alloys thereof. Preferred refractory metals are zirconium, titanium, stainless steel and chromium, and alloys thereof such as zirconium-titanium alloy.

The metal compounds and metal alloy compounds, preferably the refractory metal compounds and refractory metal alloy compounds, include the nitrides, carbides, carbonitrides, oxides, oxynitrides (reaction products of the metal, nitrogen and oxygen) and oxycarbonitrides (reaction products of the metal, oxygen, nitrogen and carbon). Preferred metals, metal alloys, metal compounds and metal alloy compounds which comprise color layer 25 are chromium, stainless steel, zirconium nitride, titanium nitride, zirconium-titanium nitride, and zirconium-titanium carbonitride.

Layer 25 is deposited on layer 23 by any of the well known and conventional vapor deposition techniques described supra such as for example, reactive sputtering and reactive cathodic arc evaporation.

Layer 25 provides the desired color or appearance of the coating and also contributes to the overall wear and abrasion resistance of the coating. If, for example, layer 25 is comprised of chromium it will have a "bright chrome" color, while if comprised of zirconium nitride it will have a color resembling brass. If layer 25 is comprised of titanium-zirconium alloy nitride it will have a color resembling gold. Color layer 25 has a thickness at least effective to provide the desired color appearance, and wear resistance and abrasion resistance. Generally layer 25 has a thickness of at least about 50 nm, preferably about 300 nm. The upper thickness range is not critical but is governed by secondary considerations such as cost and the like. Generally layer 25 should not be thicker than about one micron, preferably about 500 nm.

Figure 2:
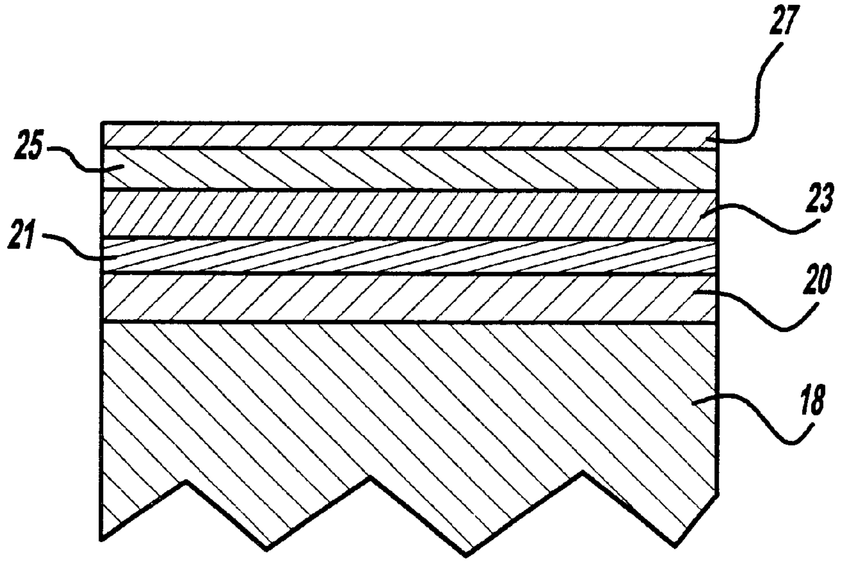
FIG. 2 is a view similar to FIG. 1 of another embodiment of the instant invention illustrating the top layer comprised of a non-precious refractory metal or metal alloy oxide or of the reaction products of a non-precious refractory metal or metal alloy, oxygen and nitrogen.

In one embodiment, as illustrated in FIG. 1, color layer 25 is the top layer of the multi-layer coating. In another embodiment, as illustrated in FIG. 2, a thin transparent protective layer 27 is deposited over color layer 25. Transparent protective layer 27 comprises (i) metal oxide, (ii) metal nitride, or (iii) reaction products of metal, oxygen and nitrogen, in which the metal is either chromium or the metal or metal alloy comprising layer 25. For example, if color layer 25 comprises zirconium nitride, transparent layer 27 preferably comprises the reaction products of zirconium, oxygen and nitrogen. If color layer comprises stainless steel transparent layer 27 preferably comprises the reaction products of stainless steel, oxygen and nitrogen, or the reaction products of chromium, oxygen and nitrogen.

These metal oxides and metal nitrides including zirconium oxide and zirconium nitride and their preparation and deposition are conventional and well known, and are disclosed, inter alia, in U.S. Pat. No. 5,367,285, the disclosure of which is incorporated herein by reference.

The layer 27 can be deposited by well known and conventional vapor deposition techniques, including reactive sputtering and reactive cathodic arc evaporation.

In another embodiment instead of layer 27 being comprised of the reaction products of chrome, a metal or metal alloy, oxygen and nitrogen, it is comprised of chromium oxide, metal oxide or metal alloy oxide. The metal oxides and metal alloy oxides of which layer 27 is comprised include, but are not limited to, hafnium oxide, tantalum oxide, zirconium oxide, titanium oxide, and zirconium-titanium alloy oxide, preferably titanium oxide, zirconium oxide, and zirconium-titanium alloy oxide, and more preferably zirconium oxide. These oxides and their preparation are conventional and well known.

Transparent protective layer 27 has a thickness at least effective to provide improved chemical resistance. Generally this thickness is at least about 1 nm, preferably at least about 5 nm. The thickness should generally not be greater than about 50 nm, preferably not greater than about 25 nm, in order to avoid changing the color of the color layer 25 or producing interference reflections. Layer 27 may be deposited by vapor deposition processes such as reactive cathodic arc evaporation or reactive sputtering.

In order that the invention may be more readily understood the following example is provided. The example is illustrative and does not limit the invention thereto.

EXAMPLE 1

This example illustrates a coating containing an adhesion promoting chrome layer.

Clean faucets are mounted on racks and lowered into a tank of epoxy urethane paint. A voltage is applied to the parts and slowly ramped to negative 100 V relative to anodes on the sides of the tank, while maintaining the current below 1 ampere. The electric charge transferred (Coulombs) should be about 60% of the total by the time negative 100 V is reached. The total charge transferred to the faucet along with the surface area of the faucet determine the final thickness of the paint film. For a single faucet, about 20 to 30 coulombs of charge transfer are required to obtain a paint thickness of about 0.5 mils. The racks are then lifted out of the paint tank and sequentially dipped into a set of three rinse tanks, each subsequent rinse tank containing less paint and more deionized water. The last rinse tank is preferably deionized water with a resistivity exceeding $10^6$ ohm-cm. Following the last rinse, the faucets are dried in a hot air dryer. Then the paint is cured in two stages. The first stage is at 300° F. for 18 minutes followed by 525° F. for 18 minutes. The racks are then removed from the oven.

The epoxy coated faucets are placed in a deposition chamber incorporating an arc evaporation cathode. The arc source may be fitted with shielding or filtering means to reduce macroparticle incorporation in the coating, as described for example in U.S. Pat. No. 5,840,163 (Welty) or in copending applications Ser. No. 09/291,343, Linear Magnetron Arc Evaporation Source (Welty), and Ser. No. 09/291,455, Rectangular Filtered Arc Plasma Source (Welty). Sources of argon, oxygen and nitrogen are connected to the chamber through a manifold with adjustable valves for varying the individual rate of flow of each of these gases into the chamber. The cathode is connected to the negative outputs of a variable DC power supply. The positive side of the power supply is connected to the chamber wall. The cathode material comprises chromium. The epoxy-coated faucets are disposed in front of the cathode, and may be rotated or otherwise moved during deposition to ensure uniform coating thickness. The faucets are electrically isolated from the chamber and are connected through the mounting rack to the output of a power supply so that a bias voltage may be applied to the substrates during coating. Prior to deposition the vacuum chamber is evacuated to a pressure of about $2\times10^{-5}$ torr.

Oxygen gas is then introduced at a rate sufficient to maintain a pressure of about 25 millitorr. The epoxy coated faucets are then subjected to a glow discharge plasma cleaning in which a negative bias voltage of about 500 volts is applied to the rack and epoxy coated faucets. The duration of the cleaning is approximately 5 minutes.

A layer of chromium having a thickness of about 20 nm is then deposited on the epoxy coated faucets during an approximately two minute period. The deposition process consists of applying DC power to the cathode to achieve a current flow of about 200 amperes while introducing argon gas into the vessel to maintain the pressure in the vessel at a pressure around 3 millitorr.

After the chromium adhesion layer is deposited, a strengthening layer of chromium nitride is deposited by admitting a flow of nitrogen into the vacuum chamber while continuing to operate the arc discharge at a current flow of about 200 amperes. The flow of nitrogen is sufficient to increase the total pressure to about 20 millitorr. A negative voltage bias of 20 volts is applied to the racks and substrates. An additional flow of argon gas may also be introduced into the vessel to help stabilize the discharge. The time for deposition of the CrN layer is 100 minutes at a deposition rate of 20 nm/min.

After the chromium nitride layer is deposited, a top chromium layer is deposited by turning off the nitrogen flow while increasing the argon flow to maintain a pressure of 10 millitorr in the chamber while the arc discharge continues. The total time of the chromium deposition is 5 minutes. The arc is extinguished at the end of this last deposition period, the vacuum chamber is vented, and the coated faucets removed.

EXAMPLE 2

This example illustrates a coating which does not contain a chrome adhesion promoting layer.

Clean faucets are mounted on racks and lowered into a tank of epoxy urethane paint. A voltage is applied to the parts and slowly ramped to negative 100 V relative to anodes on the sides of the tank, while maintaining the current below 1 ampere. The electric charge transferred (Coulombs) should be about 60% of the total by the time negative 100 V is reached. The total charge transferred to the faucet along with the surface area of the faucet determine the final thickness of the paint film. For a single faucet, about 20 to 30 coulombs of charge transfer are required to obtain a paint thickness of about 0.5 mils. The racks are then lifted out of the paint tank and sequentially dipped into a set of three rinse tanks, each subsequent rinse tank containing less paint and more deionized water with a resistivity exceeding $10^6$ ohm-cm. Following the last rinse, the faucets are dried in a hot air dryer. Then, the paint is cured in two stages. The first stage is at 300° F. for 18 minutes followed by 525° F. for 18 minutes. The racks are then removed from the oven.

The epoxy coated faucets are placed in a deposition chamber incorporating an arc evaporation cathode. The arc source may be fitted with shielding or filtering means to reduce macroparticle incorporation in the coating, as described for example in U.S. Pat. No. 5,840,163 (Welty) or in copending applications Ser. No. 09/291,343, Linear Magnetron Arc Evaporation Source (Welty), and Ser. No. 09/291,455, Rectangular Filtered Arc Plasma Source (Welty). Sources of argon, oxygen and nitrogen are connected to the chamber through a manifold with adjustable valves for varying the individual rate of flow of each of these gases into the chamber. The cathode is connected to the negative outputs of a variable DC power supply. The positive side of the power supply is connected to the chamber wall. The cathode material comprises chromium. The epoxy coated faucets are disposed in front of the cathode, and may be rotated or otherwise moved during deposition to ensure uniform coating thickness. The faucets are electrically isolated from the chamber and are connected through the mounting rack to the output of a power supply so that a bias voltage may be applied to the substrates during coating. Prior to deposition the vacuum chamber is evacuated to a pressure of about $2\times10^{-5}$ torr.

Oxygen gas is then introduced at a rate sufficient to maintain a pressure of about 25 millitorr. The epoxy coated faucets are then subjected to a glow discharge plasma cleaning in which a negative bias voltage of about 500 volts is applied to the rack and epoxy coated faucets. The duration of the cleaning is approximately 5 minutes.

After the glow discharge cleaning, a strengthening layer of chromium nitride is deposited by admitting a flow of nitrogen into the vacuum chamber while operating the arc discharge at a current flow of about 200 amperes. The flow of nitrogen is sufficient to increase the total pressure to around 20 microbar. A negative voltage bias of 20 volts is applied to the racks and substrates. An additional flow of argon gas may also be introduced into the vessel to help stabilize the discharge. The time for deposition of the CrN layer is 100 minutes at a deposition rate of 20 nm/min.

After the chromium nitride layer is deposited, a top chromium layer is deposited by turning off the nitrogen flow while increasing the argon flow to maintain a pressure of 10 millitorr in the chamber while the arc discharge continues. The total time of the chromium deposition is 5 minutes. The arc is extinguished at the end of this last deposition period, the vacuum chamber is vented and the coated substrates removed.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. An article having on at least a portion of its surface a coating comprising:

base coat layer comprised of polymer;

layer comprised of chromium compound wherein said compound is a carbide, carbonitride, nitride, oxide or oxynitride;

color layer comprised of metal, metal alloy, metal compound or metal alloy compound.

2. The article of claim 1 wherein said chromium compound is chromium nitride.

3. The article of claim 1 wherein said color layer is comprised of a metal compound or metal alloy compound.

4. The article of claim 3 wherein said metal compound or metal alloy compound is selected from a nitride, a carbide, an oxide and a carbonitride.

5. The article of claim 4 wherein said metal or metal alloy is selected from chromium, stainless steel, zirconium, titanium and zirconium-titanium alloy.

6. The article of claim 5 wherein said metal compound or metal alloy compound is selected from zirconium nitride, titanium nitride, and zirconium-titanium alloy nitride.

7. The article of claim 1 which further includes a top layer comprised of a metal oxide or metal alloy oxide.

8. The article of claim 7 wherein said metal oxide or metal alloy oxide is selected from chromium oxide, zirconium oxide, titanium oxide and zirconium-titanium alloy oxide.

9. The article of claim 1 which further includes a top layer comprised of the reaction products of (a) a metal or metal alloy, (b) nitrogen and (c) oxygen.

10. The article of claim 9 wherein said metal or metal alloy is selected from chromium, zirconium, titanium and zirconium-titanium alloy.

11. The article of claim 9 wherein said metal is selected from zirconium.

12. The article of claim 1 wherein said layers comprised of chromium compound and said color layer are deposited by vapor deposition.

13. The article of claim 12 wherein said vapor deposition is physical vapor deposition.

14. An article having on at least a portion of its surface a coating comprising:

base coat layer comprised of polymer;

layer comprised of chrome;

layer comprised of chromium compound wherein said compound is a carbide, carbonitride, nitride, oxide or oxynitride;

color layer comprised of metal, metal alloy, metal compound or metal alloy compound.

15. The article of claim 14 wherein said color layer is comprised of chromium or a metal compound or metal alloy compound.

16. The article of claim 14 wherein said metal or metal alloy is selected from zirconium, titanium or zirconium-titanium alloy.

17. The article of claim 16 wherein said metal compound or metal alloy compound is selected from zirconium nitride, titanium nitride, and zirconium-titanium alloy nitride.

18. The article of claim 14 which further includes a top layer comprised of a metal oxide or metal alloy oxide.

19. The article of claim 18 wherein said metal oxide or metal alloy oxide is selected from zirconium oxide, titanium oxide, zirconium-titanium alloy oxide and chromium oxide.

20. The article of claim 14 which further includes a top layer comprised of the reaction products of (i) a metal or metal alloy, (ii) nitrogen and (iii) oxygen.

21. The article of claim 20 wherein said metal or metal alloy is selected from chromium, zirconium, titanium and zirconium-titanium alloy.

22. The article of claim 20 wherein said metal is selected from chromium.

23. The article of claim 14 wherein said layers comprised of chrome, chromium compound, and a metal compound or metal alloy compound are deposited by vapor deposition.

24. The article of claim 23 wherein said vapor deposition is physical vapor deposition.

* * * * *